(12) United States Patent
Ishida et al.

(10) Patent No.: US 9,193,271 B2
(45) Date of Patent: Nov. 24, 2015

(54) IN-VEHICLE CHARGER

(75) Inventors: Akira Ishida, Kanagawa (JP); Kenji Sugihara, Tokyo (JP); Norihiko Kimura, Kanagawa (JP); Tomohiro Terada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 14/005,864

(22) PCT Filed: Mar. 29, 2012

(86) PCT No.: PCT/JP2012/002196
§ 371 (c)(1),
(2), (4) Date: Sep. 18, 2013

(87) PCT Pub. No.: WO2012/132458
PCT Pub. Date: Oct. 4, 2012

(65) Prior Publication Data
US 2014/0015484 A1 Jan. 16, 2014

(30) Foreign Application Priority Data

Mar. 30, 2011 (JP) ................................ 2011-075103

(51) Int. Cl.
*B60L 11/18* (2006.01)

(52) U.S. Cl.
CPC ......... *B60L 11/1809* (2013.01); *B60L 11/1846* (2013.01); *Y02T 10/7005* (2013.01); *Y02T 90/121* (2013.01); *Y02T 90/128* (2013.01);
(Continued)

(58) Field of Classification Search
CPC .................................................. B60L 11/1809
USPC ........................................................ 320/109
See application file for complete search history.

(56) References Cited

U.S. PATENT DOCUMENTS

2008/0211230 A1* 9/2008 Gurin ................................ 290/2
2010/0039069 A1 2/2010 Niwa et al.
2010/0174667 A1 7/2010 Vitale et al.

FOREIGN PATENT DOCUMENTS

CN 101636292 A 1/2010
JP 4-102014 A 4/1992
JP 06-245325 A 9/1994

(Continued)

OTHER PUBLICATIONS

International Search Report for PCT/JP2012/002196 dated Jun. 5, 2012.

(Continued)

*Primary Examiner* — Thuan Do
(74) *Attorney, Agent, or Firm* — Pearne & Gordon LLP (57) ABSTRACT

Provided is an in-vehicle charger capable of reliably obtaining charging control parameters prior to charging and capable of safe charging. In this charger, a charging unit (105) charges a battery (111) in accordance with the charging control parameters. A storage unit (103) stores a table in which a plurality of areas on a map and the charging control parameters are made to correspond to each other. A position information receiving unit (101) obtains position indicating the current position of a vehicle (250). A control unit (104) refers to the table on the basis of the position information and sets the charging control parameters made to correspond to an area including the current position when a charging cable (107) is not connected.

9 Claims, 5 Drawing Sheets (52) U.S. Cl.
CPC ............... *Y02T90/14* (2013.01); *Y02T 90/163* (2013.01); *Y02T 90/169* (2013.01); *Y04S 30/14* (2013.01)

(56) References Cited

FOREIGN PATENT DOCUMENTS

| JP | 10-208194 A | 8/1998 |
|---|---|---|
| JP | 11-219105 A | 8/1999 |
| JP | 2006-33551 A | 12/2006 |
| JP | 2009-060727 A | 3/2009 |
| JP | 2010-200530 A | 9/2010 |
| WO | 2009/014228 A1 | 1/2009 |

OTHER PUBLICATIONS

Extended European Search Report for Application No. 12763241.2-165712692571 dated Sep. 11, 2015.

* cited by examiner

FIG. 1

| AREA [LATITUDE AND LONGITUDE] | MAXIMUM CURRENT Imax.[A] DURING CHARGING |
|---|---|
| COUNTRY A | 16 |
| COUNTRY B | 10 |
| COUNTRY C | 30 |
| COUNTRY D | 30 |
| COUNTRY E | 15 |

| AREA [LATITUDE AND LONGITUDE] | POWER SUPPLY VOLTAGE [V] |
|---|---|
| COUNTRY A | 110 |
| COUNTRY B | 230 |
| COUNTRY C | 200 |
| COUNTRY D | 220 |
| COUNTRY E | 100 |

| AREA [LATITUDE AND LONGITUDE] | POWER SUPPLY FREQUENCY F[Hz] |
|---|---|
| COUNTRY A | 60 |
| COUNTRY B | 50 |
| COUNTRY C | 50 |
| COUNTRY D | 60 |
| COUNTRY E | 60 |

IN-VEHICLE CHARGER

TECHNICAL FIELD

The present invention relates to an in-vehicle charging apparatus configured to charge a storage battery installed in an electric vehicle, for example, from an external power supply through a cable.

BACKGROUND ART

Heretofore, known in-vehicle charging apparatuses are each installed in a vehicle such as an electric vehicle and configured to charge an in-vehicle storage battery when a power cable is connected to the apparatus from an external commercial power supply (e.g., Patent Literature 1). During this charging, the in-vehicle charging apparatus acquires a charge control parameter from the commercial power supply through communication using the power cable as the communication path. The in-vehicle charging apparatus sets the acquired charge control parameter and continues the charging operation. As described herein, the in-vehicle, charging apparatus performs charging according to the charge control parameter after setting the charge control parameter.

CITATION LIST

Patent Literature

PTL 1
WO 2009-014228

SUMMARY OF INVENTION

Technical Problem

However, the in-vehicle charging apparatus in the related art cannot acquire a charge control parameter before the apparatus starts charging. This is because the in-vehicle charging apparatus in the related art acquires a charge control parameter through communication using, as the communication path, the power cable used for charging. Accordingly, the in-vehicle charging apparatus in the related art sets a charge control parameter after the apparatus starts charging by connecting the power cable to an external commercial supply. This configuration has a problem involving a risk of causing a fire by an excessive current flowing through the in-vehicle charging apparatus or the like before a charge control parameter is set.

It is an object of the present invention to allow a charge control parameter to be surely acquired before start of charging and thereby to enable safe charging.

Solution to Problem

An in-vehicle charging apparatus according to an aspect of the present invention is configured to charge a storage battery to be installed in a vehicle, from a power supply located outside the vehicle through a cable, the in-vehicle charging apparatus including: a charging section that charges the storage battery according to a charge control parameter; a storage section that stores a table associating a plurality of areas on a map with a plurality of the charge control parameters; an acquisition section that acquires position information indicating a current position of the vehicle; and a control section that sets a charge control parameter associated with an area including the current position with reference to the table on a basis of the position information, when the cable is not connected.

Advantageous Effect of Invention

According to the present invention, a charge control parameter in accordance with the area in which the vehicle is present is acquired when the cable is not connected to the vehicle. Thus, the charge control parameter can be surely acquired prior to charging, which in turn enables safe charging.

DESCRIPTION OF EMBODIMENT

Hereinafter, an embodiment of the present invention will be described in detail with reference to the drawings.

(Embodiment)
(Configuration of Charging System)

Figure 1:
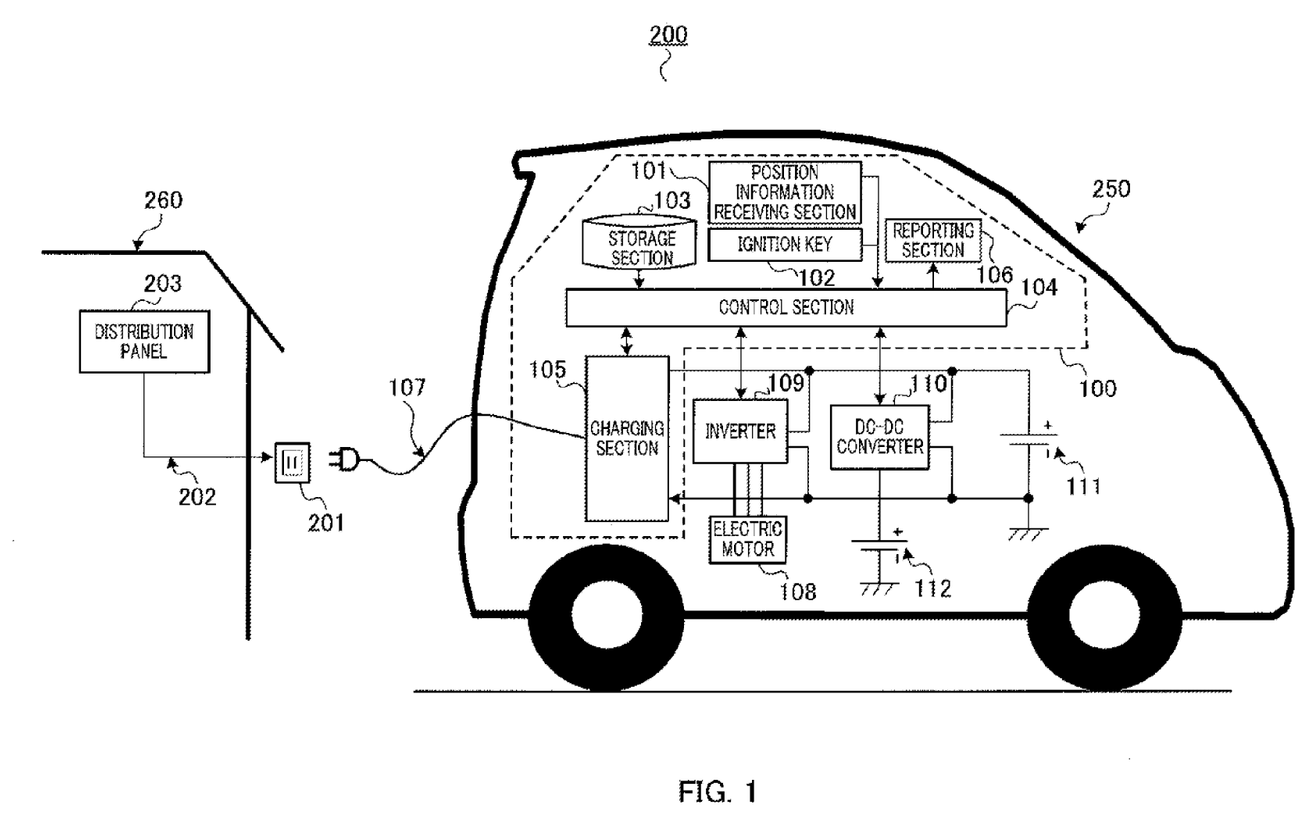
FIG. 1 is a diagram illustrating a configuration of a charging system in an embodiment of the present invention.

FIG. 1 is a diagram illustrating charging system 200 in an embodiment of the present invention.

Vehicle 250 includes in-vehicle charging apparatus 100, charging cable 107, electric motor 108, inverter 109, DC/DC converter 110, storage battery 111, and lead-acid battery 112. In addition, vehicle 250 runs on electrical energy as a power source, which is accumulated in storage battery 111 charged by in-vehicle charging apparatus 100.

Charging stand 260 includes power outlet 201, charging cable 202, and distribution panel 203 connected to a commercial power supply located outside the vehicle. Charging stand 260 charges storage battery 111 via in-vehicle charging apparatus 100 installed in vehicle 250.

In-vehicle charging apparatus 100 includes position information receiving section 101, ignition key 102, storage section 103, control section 104, charging section 105, and reporting section 106. In-vehicle charging apparatus 100 charges storage battery 111 installed in vehicle 250. Specifically, in-vehicle charging apparatus 100 acquires and sets a charge control parameter when charging cable 107 is not connected to power outlet 201, and then, in-vehicle charging apparatus 100 starts charging storage battery 111 according to the set charge control parameter. The configuration of in-vehicle charging apparatus 100 will be described in detail, hereinafter.

Electric motor 108 is configured to generate power to rotate driving wheels of the vehicle. In addition, electric motor 108 is coupled to the axle of driving heels of the vehicle and is also capable of converting kinetic energy generated when vehicle 250 decelerates into electrical energy (regenerative energy). Electric motor 108 outputs the electric energy obtained by conversion to inverter 109.

Inverter 109 converts the electrical energy received from electric motor 108, from alternating current to direct current. Inverter 109 accumulates direct-current electrical energy in storage battery 111.

DC/DC converter 110 transforms, in accordance with control made by control section 104, direct-current electrical energy outputted from charging section 105 or storage battery 111. In addition, DC/DC converter 110 accumulates the transformed electrical energy in lead-acid battery 112 other than storage battery 111.

Storage battery 111 accumulates direct-current electrical energy outputted from inverter 109 and also accumulates direct-current electrical energy outputted from charging section 105. A secondary battery having a large energy density (such as nickel-hydrogen rechargeable battery, and lithium-ion rechargeable battery, for example), or a large-capacity capacitor may be used as storage battery 111.

(Configuration of In-Vehicle Charging Apparatus)

Position information receiving section 101 acquires position information through a radio link. Specifically, position information receiving section 101 receives signals from a plurality of global positioning system (GPS) satellites and acquires position information indicating the current position of vehicle 250 by demodulating the received signals. Position information receiving section 101 outputs the acquired position information to control section 104.

Ignition key 102 is provided to allow the engine (not shown) to start or allow vehicle 250 to run. Ignition key 102 also outputs information indicating whether or not ignition key 102 is turned on to control section 104.

Storage section 103 stores a table associating areas with charge control parameters in storage section 103. Note that, a description will be provided regarding the table, hereinafter.

Upon reception of information indicating that ignition key 102 has been turned on from ignition key 102, control section 104 reads, from storage section 103, a charge control parameter corresponding to the position information received from position information receiving section 101.

Specifically, control section 104 determines whether or not there is an area including the position information received from position information receiving section 101 in the table stored in storage section 103. When there is an area including the position information received from position information receiving section 101 in the table, control section 104 reads the charge control parameter associated with the area from storage section 103, when charging cable 107 is not connected to power outlet 201. When none of the areas in the table includes the position information received from position information receiving section 101, control section 104 reads a charge control parameter having the lowest value in the table from storage section 103, when charging cable 107 is not connected to power outlet 201. In this case, control section 104 controls reporting section 106 in such a way that reporting section 106 reports information indicating that none of the areas in the table includes the position information.

In addition, control section 104 sets the read charge control parameter when charging cable 107 is not connected to power outlet 201. Control section 104 controls charging section 105 in such a way that charging section 105 starts charging according to the set charge control parameter.

Charging section 105 is connected to power outlet 201 through charging cable 107, and control section 104 charges storage battery 111 according to the set charge control parameter after charging cable 107 is connected to power outlet 201.

Reporting section 106 reports information indicating that none of the areas in the table includes the current position to the driver of vehicle 250 according to control made by control section 104.

Distribution panel 203 is connected to power outlet 201 through charging cable 202 and supplies charging section 105 with electrical energy through charging cable 202, power outlet 201, and charging cable 107.

Note that, when setting a charge control parameter having the lowest value in the table, control section 104 may control a display section (not illustrated) in such a way that the display section displays the setting or may control a speaker (not illustrated) in such a way that the setting is announced from the speaker by sound. Accordingly, the driver of vehicle 250 moves vehicle 250 and looks for an area registered in the table and can perform charging in the area.

(Operation to Set Charge Control Parameter)

Position information receiving section 101 acquires position information indicating the current position of vehicle 250, through a radio link when charging cable 107 installed in vehicle 250 is not connected to power outlet 201. Storage section 103 stores therein a table associating a plurality of areas on the map and a plurality of charge control parameters. Meanwhile, when charging cable 107 is not connected to power outlet 201, control section 104 reads and sets a charge control parameter associated with the area including the current position with reference to the table stored in storage section 103, on the basis of the position information received from position information receiving section 101.

Figure 2:
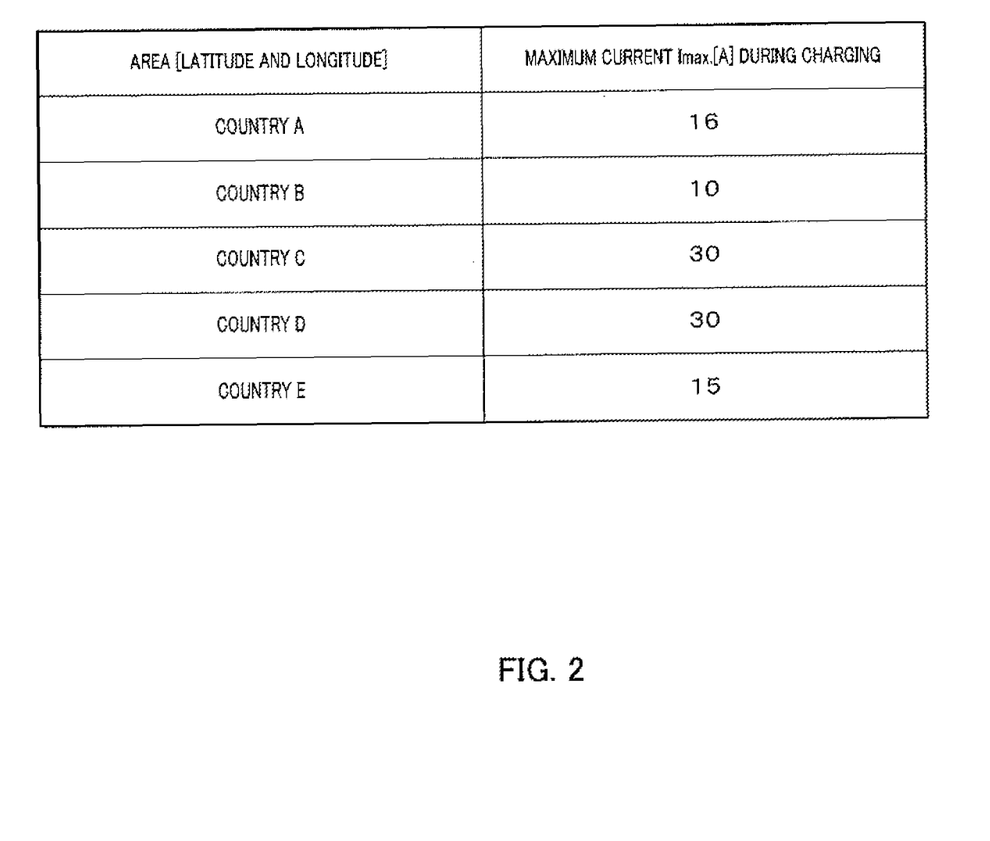
FIG. 2 is a diagram illustrating a table to he stored in a storage section when a maximum current during charging is used as a charge control parameter in an embodiment of the present invention.

FIG. 2 is a diagram illustrating a table stored in storage section 103 when the maximum current during charging is set as a charge control parameter.

The table illustrated in FIG. 2 associates a plurality of areas on the map with the maximum currents Imax during charging, respectively. In addition, each area is identified by latitude and longitude in FIG. 2. Each area is set to a different country as illustrated in FIG. 2, for example. The maximum currents Imax during charging indicate the maxim currents flowing through in-vehicle charging apparatus 100 charged performed in the areas, respectively. Control section 104 sets the maximum current Imax during charging associated with the area including the current position, when charging cable 107 is not connected to power outlet 201. As a result, safety during charging performed using the maximum current Imax during charging in each of the areas can be secured.

To put it more specifically, the thickness of charging cable 202 used for commercial power supplies varies in each country. For this reason, the maximum current value allowed to flow through charging cable 202 varies depending on the thickness of charging cable 202. It is difficult for vehicle 250 to measure this maximum current value. Charging by vehicle 250 using a current exceeding the maximum current value allowed during charging, which depends upon the thickness of charging cable 202, involves a risk that charging cable 202 generates heat or causes a fire. For this reason, being able to set the maximum current Imax during charging before charging starts is very important.

Figure 3:
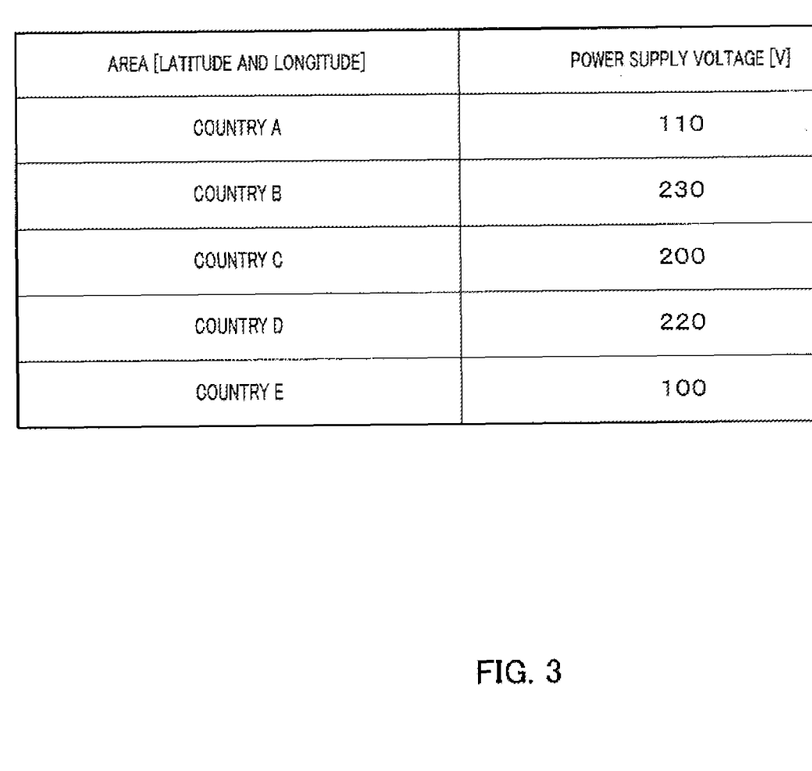
FIG. 3 is a diagram illustrating a table to be stored in a storage section when a power supply voltage is used as a charge control parameter in an embodiment of the present invention.

FIG. 3 is a diagram illustrating a table stored in storage section 103 when a power supply voltage is set as a charge control parameter.

The table illustrated in FIG. 3 associates a plurality of areas on the map with a plurality of power supply voltages V, respectively. In addition, the power supply voltages indicate power supply voltages V used for charging performed in the areas, respectively. Control section 104 sets the power supply voltage V associated with the area including the current position, when charging cable 107 is not connected to power outlet 201. As a result, safety during charging performed using the power supply voltage V in each of the areas can be secured.

Figure 4:
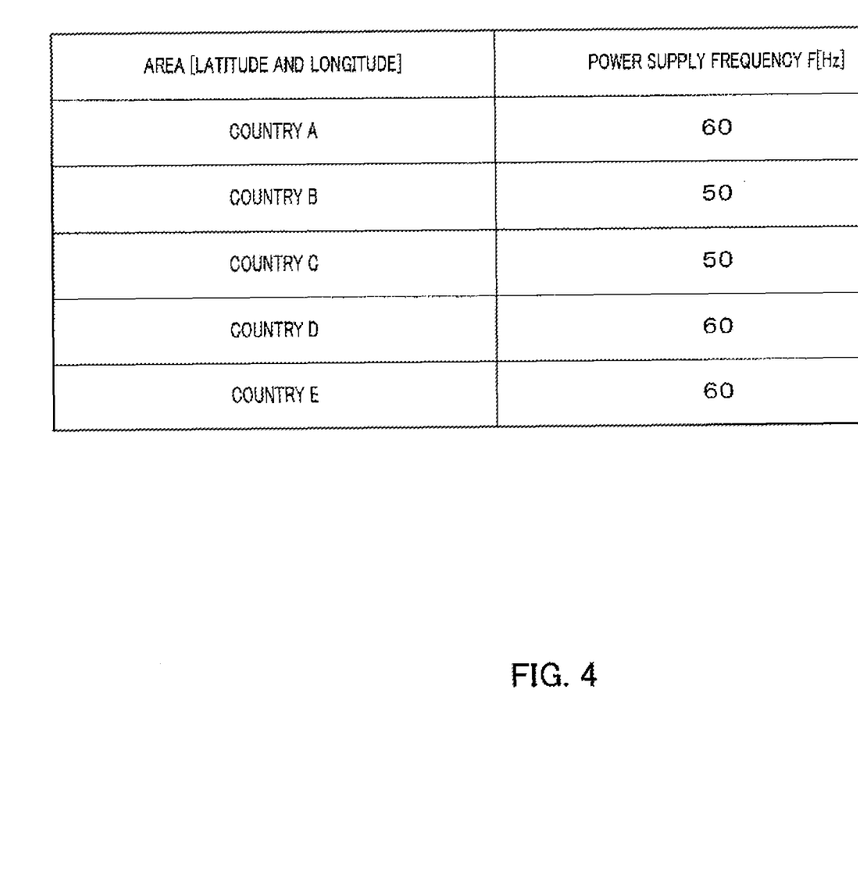
FIG. 4 is a diagram illustrating a table to be stored in a storage section when a power supply frequency is used as a charge control parameter in an embodiment of the present invention.

FIG. 4 is a diagram illustrating a table stored in storage section 103 when a power supply frequency is set as a charge control parameter.

The table illustrated in FIG. 4 associates a plurality of areas on the map with a plurality of power supply frequencies F, respectively. In addition, the power supply frequencies F indicate power supply frequencies F used for charging performed in the areas, respectively. Control section 104 sets the power supply frequency F associated with the area including the current position, when charging cable 107 is not connected to power outlet 201. As a result, safety during charging performed using the power supply frequency F in each of the areas can be secured.

Note that, control section 104 sets a charge control parameter having the lowest value in the table, when control section 104 finds that none of the areas in the table stored in storage section 103 includes the current position with reference to the table based on the position information received from position information receiving section 101, and also, the maximum current is set as a charge control parameter.

For example, control section 104 sets 10[A] associated with country B, which is the lowest value of the maximum current Imax during charging, in the table illustrated in FIG. 2. In particular, it is effective to set the lowest value of the maximum current Imax as the charge control parameter when none of the areas in the table includes the current position. As described above, it is difficult for vehicle 250 to measure the maximum current value of charging cable 202 allowed during charging, so that setting the value considered the safest when vehicle 250 has no charge control parameter associated with the area is effective in preventing charging cable 202 from generating heat or causing a fire.

(Timing of Setting Charge Control Parameter)

Figure 5:
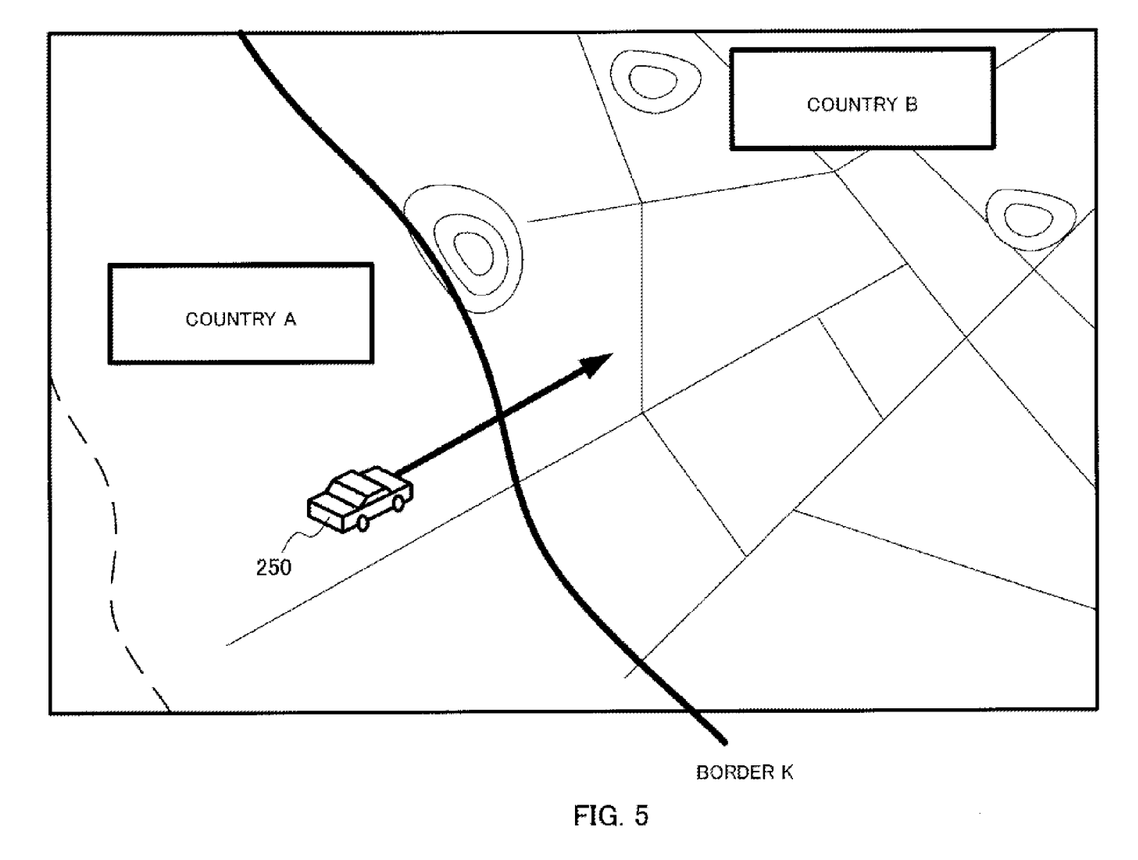
FIG. 5 is a diagram illustrating an example of timing at which a charge control parameter is set in an embodiment of the present invention.

FIG. 5 is a diagram illustrating an example of the timing of setting a charge control parameter. In FIG. 5, vehicle 250 supposedly moves from country A to country B. In addition, border K is a border between country A and country B.

In FIG. 5, position information receiving section 101 acquires position information indicating the current position in the area of country B when vehicle 250 enters country B from country A across border K.

Accordingly, control section 104 of vehicle 250 sets a charge control parameter associated with country 13 with reference to the table stored in storage section 103.

For example, in the case of the table illustrated in FIG. 2, control section 104 acquires and sets the maximum current 10[A] during charging, which is associated with country B, while vehicle 250 runs. Meanwhile, in the case of the table illustrated in FIG. 3. control section 104 acquires and sets the power supply voltage 230[V] during charging, which is associated with country B, while vehicle 250 runs. Moreover, in the case of the table illustrated in FIG. 4, control section 104 acquires and sets power supply frequency 50 [Hz] associated with country B, while vehicle 250 runs.

Note that, vehicle 250 starts charging at charging stand 260 in country B after setting the charge control parameter.

As described above, in this embodiment, the charge control parameter corresponding to the acquired position information indicating the current position is set when the charging cable is not connected. As a result, according to the present embodiment, the charge control parameter can he surety acquired prior to charging, which in turn enables safe charging.

In addition, according to the present embodiment, setting the maximum current during charging as a charge control parameter when the charging cable is not connected can surely prevent an excessive current flowing through the in-vehicle charging apparatus or the like during charging and thus can create a situation where a risk of causing a fire or the like can be avoided.

In this embodiment, a charge control parameter having the lowest value in the table is set when none of the areas in the table includes the current position indicated by the position information, and also, the maximum current during charging is set as a charge control parameter. As a result, according to the present invention, even when none of the areas in the table includes the current position indicated by the position information, the charge control parameter can be set before charging starts.

According to the present embodiment, the absence of the current position in the areas of the table is reported, so that the driver of the vehicle can be notified of the possibility of unsafe charging.

Note that, although the maximum current, power supply voltage, and power supply frequency during charging are used as charge control parameters in this embodiment, the present invention is not limited to this embodiment, and an optional parameter other than the maximum current, power supply voltage, and power supply frequency during charging can be used.

In this embodiment, upon reception of information to the effect that ignition key 102 has been turned on, control section 104 reads, from storage section 103, a charge control parameter corresponding to the position information received from position information receiving section 101. However, the present invention is not limited to this embodiment, and even when ignition key 102 is turned off, a charge control parameter can be read from storage section 103 as long as charging cable 107 is not connected to power outlet 201.

However, charging may start when ignition key 102 is turned off, so that it is advantageous to read a charge control parameter in advance upon reception of information to the effect that ignition key 102 has been turned on, in terms of surely acquiring a charge control parameter prior to charging and thereby enabling safe charging.

The above embodiment has been described with an example in which the present invention is implemented by hardware, but the present invention can be realized by software in combination with hardware.

In addition, the functional blocks used in the description of the embodiment are typically implemented as LSI devices, which are integrated circuits. The functional blocks may be formed as individual chips, or a part or all of the functional blocks may be integrated into a single chip. Although the term "LSI" is used herein, the terms including "IC," "system LSI," "super LSI" or "ultra LSI" may be used as well depending on the level of integration.

In addition, the circuit integration is not limited to LSI and may be achieved by dedicated circuitry or a general-purpose processor other than LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, drawing, and abstract of Japanese Patent Application No. 2011-75103, filed on Mar. 30, 2011, is incorporated herein by reference in its entirety.

INDUSTRIAL APPLICABILITY

The in-vehicle charging apparatus and the method of setting a charge control parameter according to the present invention are advantageous in charging a storage battery installed in an electric vehicle, for example.

REFERENCE SIGNS LIST

100 In-vehicle charging apparatus
101 Position information receiving section
102 ignition key
103 Storage section
104 Control section
105 Charging section
106 Reporting section
107, 202 Charging cable
108 Electric motor
109 Inverter
110 DC/DC Converter
111 storage battery
200 Charging system
201 Power outlet
203 Distribution panel
250 Vehicle
260 Charging stand

The invention claimed is:

1. An in-vehicle charging apparatus configured to charge a storage battery to be installed in a vehicle, from a power supply located outside the vehicle through a cable, the in-vehicle charging apparatus comprising:
   a charging section that charges the storage battery according to a charge control parameter;
   a storage section that stores a table associating a plurality of areas on a map with a plurality of the charge control parameters;
   an acquisition section that acquires position information indicating a current position of the vehicle; and
   a control section that sets a charge control parameter associated with an area including the current position of the vehicle with reference to the table on a basis of the position information, when the cable is not connected.

2. The in-vehicle charging apparatus according to claim 1, wherein the charge control parameter is a maximum current in each of the areas during charging.

3. The in-vehicle charging apparatus according to claim 2, wherein the control section sets a maximum current having a lowest value among the maximum currents in the respective areas during charging in the table, when none of the areas in the table includes the current position of the vehicle.

4. The in-vehicle charging apparatus according to claim 1, wherein:
   the storage section stores the table associating a plurality of countries corresponding to the plurality of areas with a plurality of the charge control parameters;
   the acquisition section acquires the position information of a destination country when the vehicle moves across a border; and
   the control section sets, before charging of the storage battery, a charge control parameter associated with a country including the current position of the vehicle, with reference to the table on a basis of the position information of the destination country.

5. The in-vehicle charging apparatus according to claim 1, wherein the control section sets a charge control parameter associated with an area including the current position of the vehicle, when ignition is turned on.

6. The in-vehicle charging apparatus according to claim 1, further comprising a reporting section that reports the absence of the current position of the vehicle in the areas in the table when none of the areas in the table includes the current position of the vehicle.

7. The in-vehicle charging apparatus according to claim 1, wherein the charge control parameter is a power supply voltage in each of the areas.

8. The in-vehicle charging apparatus according to claim 1, wherein the charge control parameter is a power supply frequency in each of the areas.

9. A vehicle comprising the in-vehicle charging apparatus according to claim 1.

* * * * *